Figure 1:
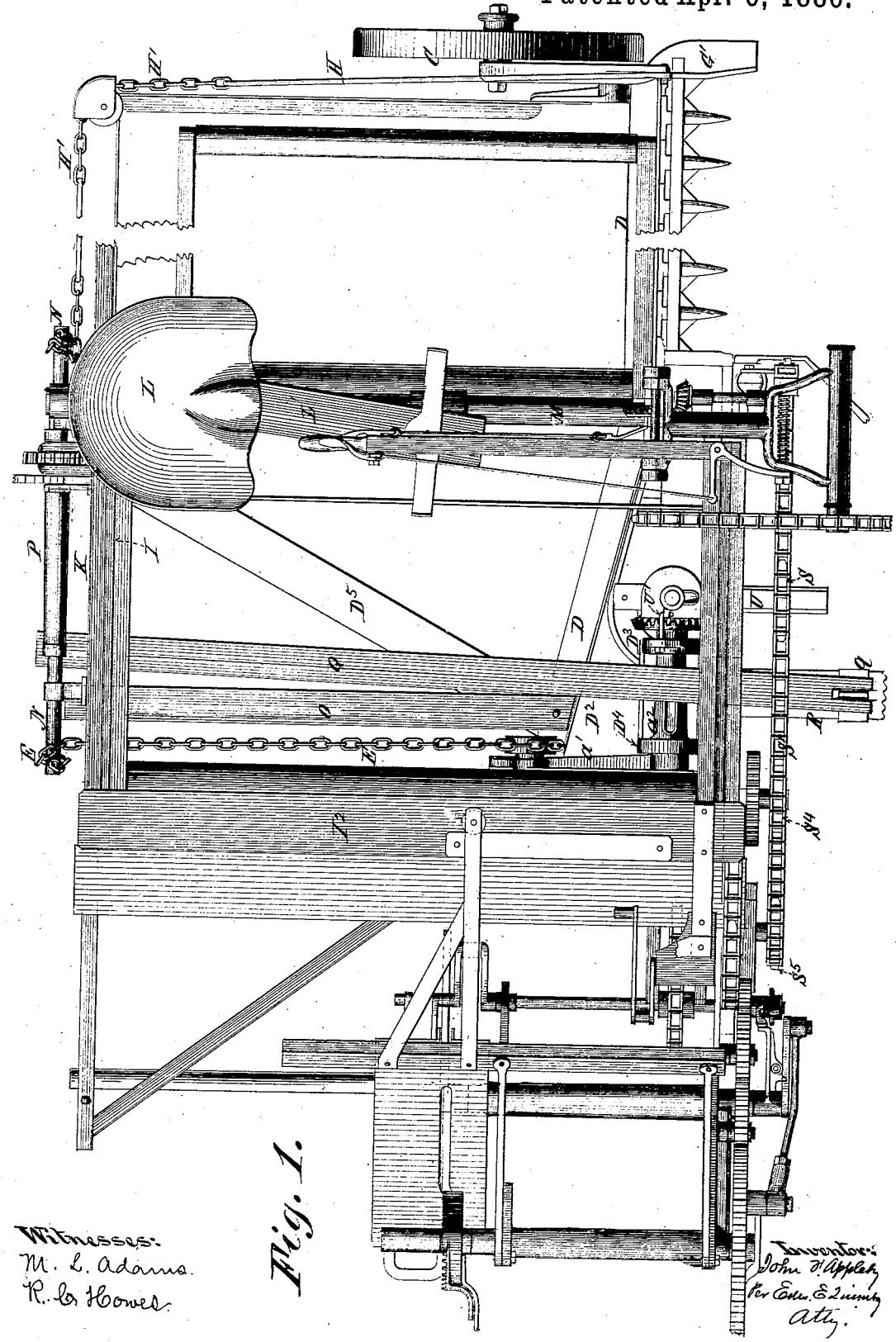

(No Model.)  
6 Sheets—Sheet 1.

J. F. APPLEBY.
COMBINED HARVESTER AND BINDER.

No. 339,126. Patented Apr. 6, 1886.

Witnesses:  
M. L. Adams.  
R. L. Howes.

Inventor:  
John F. Appleby  
per Edw. E. Quimby  
Atty.

(No Model.)

J. F. APPLEBY.
COMBINED HARVESTER AND BINDER.

No. 339,126. Patented Apr. 6, 1886.

(No Model.)  
J. F. APPLEBY.  
COMBINED HARVESTER AND BINDER.

No. 339,126. Patented Apr. 6, 1886.

6 Sheets—Sheet 6.

Witnesses:  
M. L. Adams.  
R. C. Howes.

Inventor:  
John F. Appleby,  
Per Edw. E. Quimby,  
Atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

COMBINED HARVESTER AND BINDER.

SPECIFICATION forming part of Letters Patent No. 339,126, dated April 6, 1886.

Application filed October 14, 1884. Serial No. 145,478. (No model.)

*To all whom it may concern:*

Be it known that I, JOHN F. APPLEBY, of Minneapolis, Minnesota, have invented certain Improvements in Combined Harvesters and Binders, of which the following is a specification.

My improvements are designed to simplify combined harvesters and binders in construction, and to render them easy-running and easy of adjustment, and also to strengthen and stiffen them in the places where and in the directions in which they are subjected to especial strain, so that the operations of raising, lowering, and tilting their platforms may be performed without affecting the permanent maintenance of the working parts of the apparatus in their proper relative positions.

In the machine illustrating my improvements, which is shown in the accompanying drawings, the cut grain is elevated from the platform, carried over the drive-wheel, and delivered to binding apparatus upon the stubble side of the drive-wheel; but, as will be seen, the drive-wheel is outside the platform-frame, instead of being surrounded by a wheel-frame at the grain end of the platform, as it always has been heretofore in combined harvesters and binders of the elevator type. The platform-frame or bed of the machine upon which its various sub-mechanisms—such as the reel, the elevator, and the binder—are supported is suspended at one end upon the axle of the drive-wheel, and at the other end upon the axle of the grain-wheel, and is very nearly balanced upon its two points of suspension, the axial lines of the two wheels being nearly coincident. The windlass for operating the chains by which the opposite ends of the platform are concurrently raised and lowered is situated at the rear of the machine, and the end of the windlass which adjoins the drive-wheel is supported in a bearing which is nearly in line with the pole, and which is braced by a stretcher extending diagonally forward from the bearing to the inner end of the cutter-bar, near which the pole is pivoted. The connecting-bar for transmitting to the pole the power to vary the tilt of the platform occupies a vertical plane in close proximity to that of the diagonal brace or stretcher which braces the drive-wheel end of the windlass, and has the necessary endwise motion which is required to operate it communicated by means of a crank upon the drive-wheel end of a hollow rock-shaft mounted and turning upon the windlass, or otherwise so mounted that the bearing of its crank end is in proximity to and derives support from the braced drive-wheel end bearing of the windlass. By means of this organization the frame of the machine is stiffened in a vertical plane extending from front to rear immediately adjoining the drive-wheel, so that when being raised or lowered or tilted it moves bodily without any warping or winding sufficient to throw the belt-rollers or any of the shafting out of their proper normal positions.

The gearing for driving the cutters is mounted in a frame which is suitably bolted and braced to the main frame of the machine, as hereinafter set forth.

What I call the "sub-mechanisms" of the machine are those which operate the reel, the platform-carrier, the elevator, and the binding apparatus.

Various incidental features of my machine are referred to in the subjoined detailed description.

Figure 2:
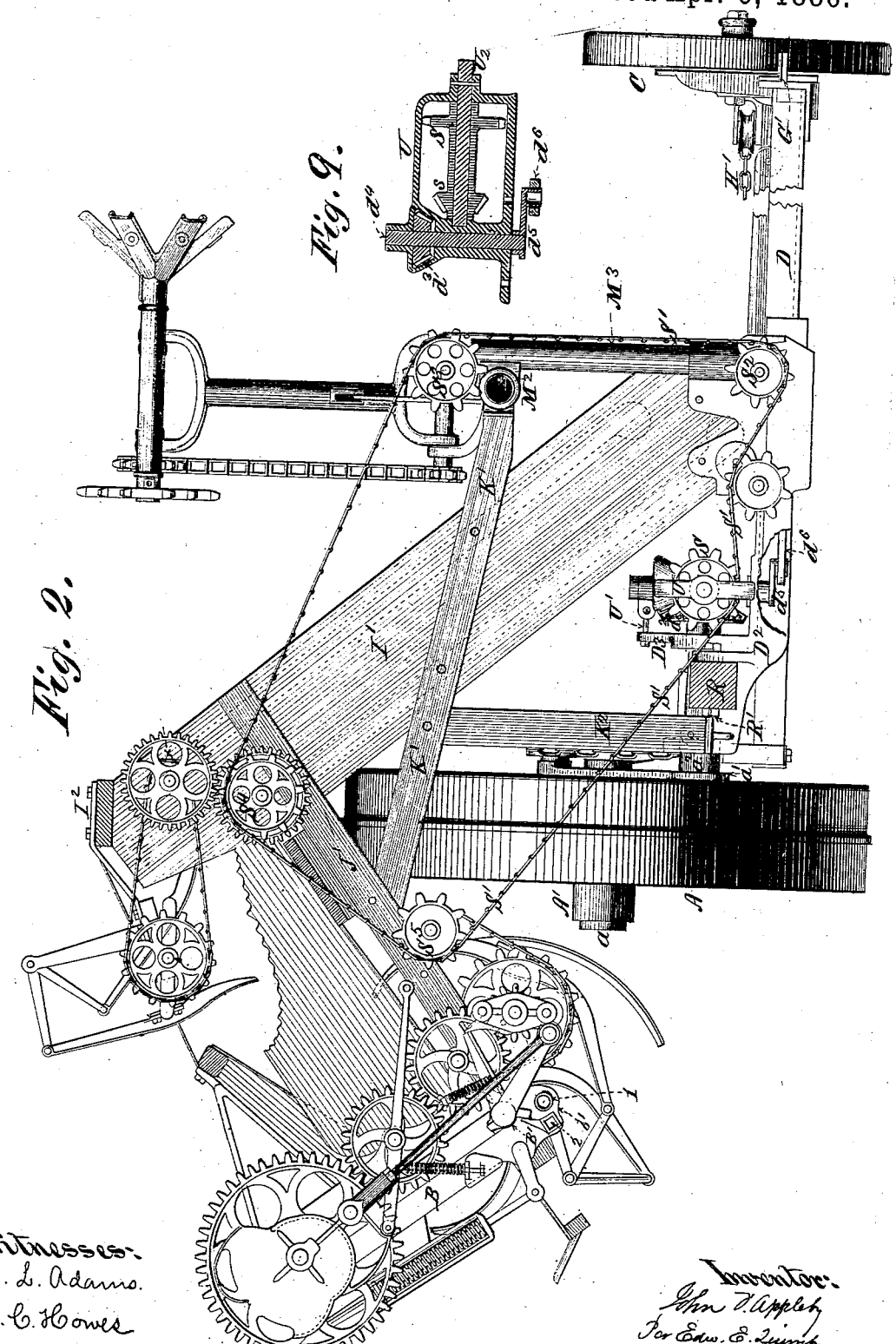
Figure 3:
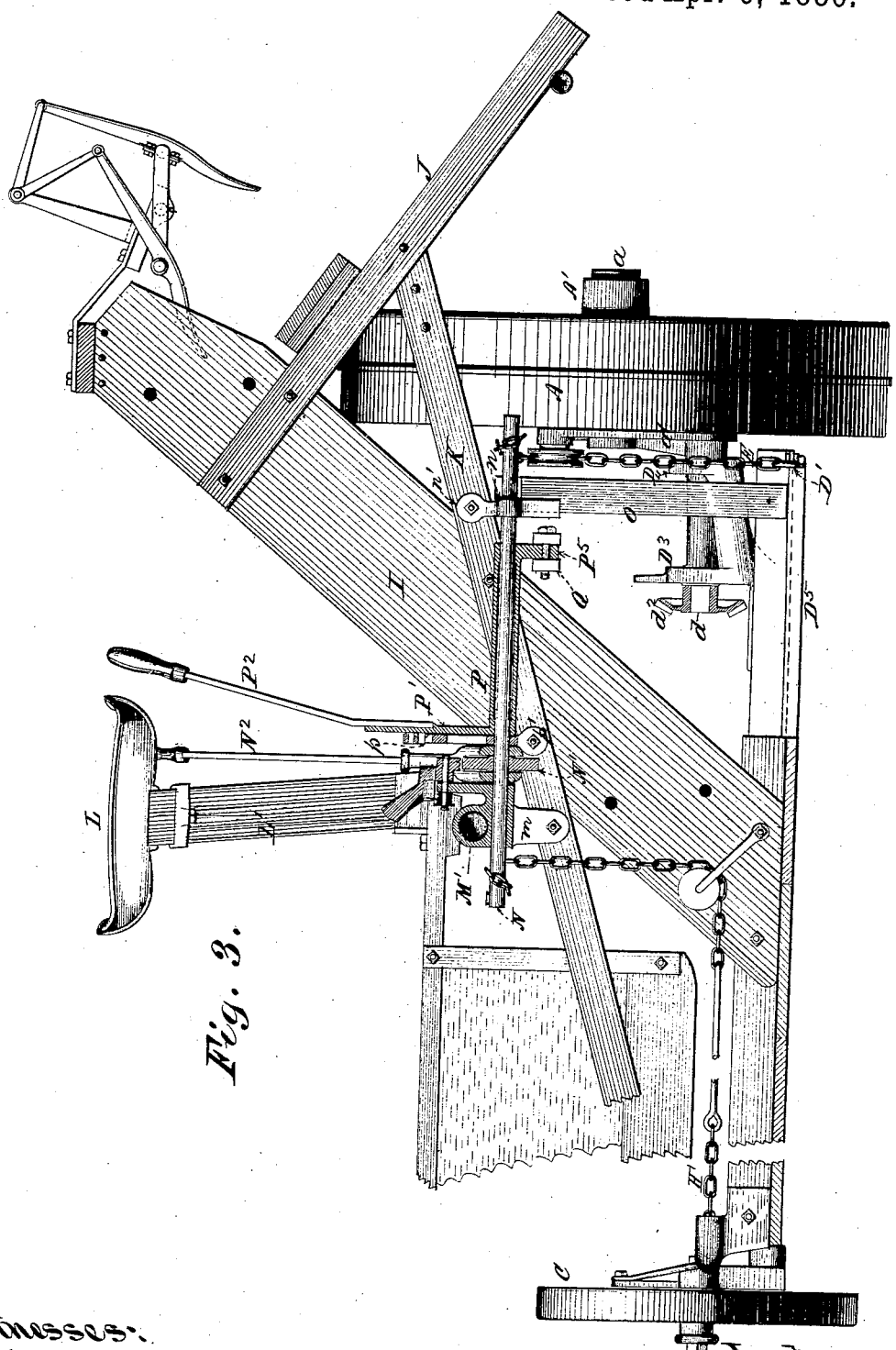
Figure 4:
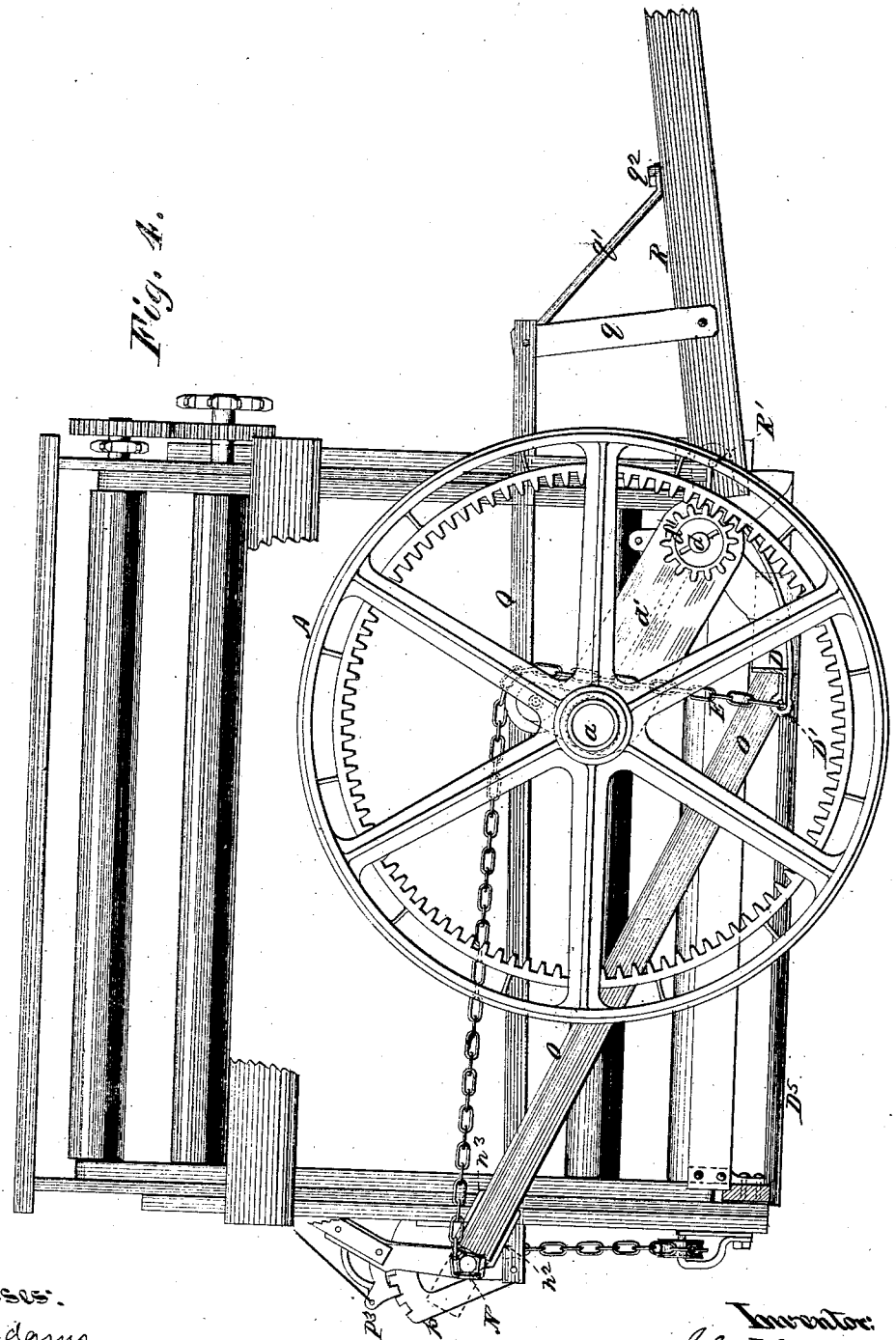
Figure 5:
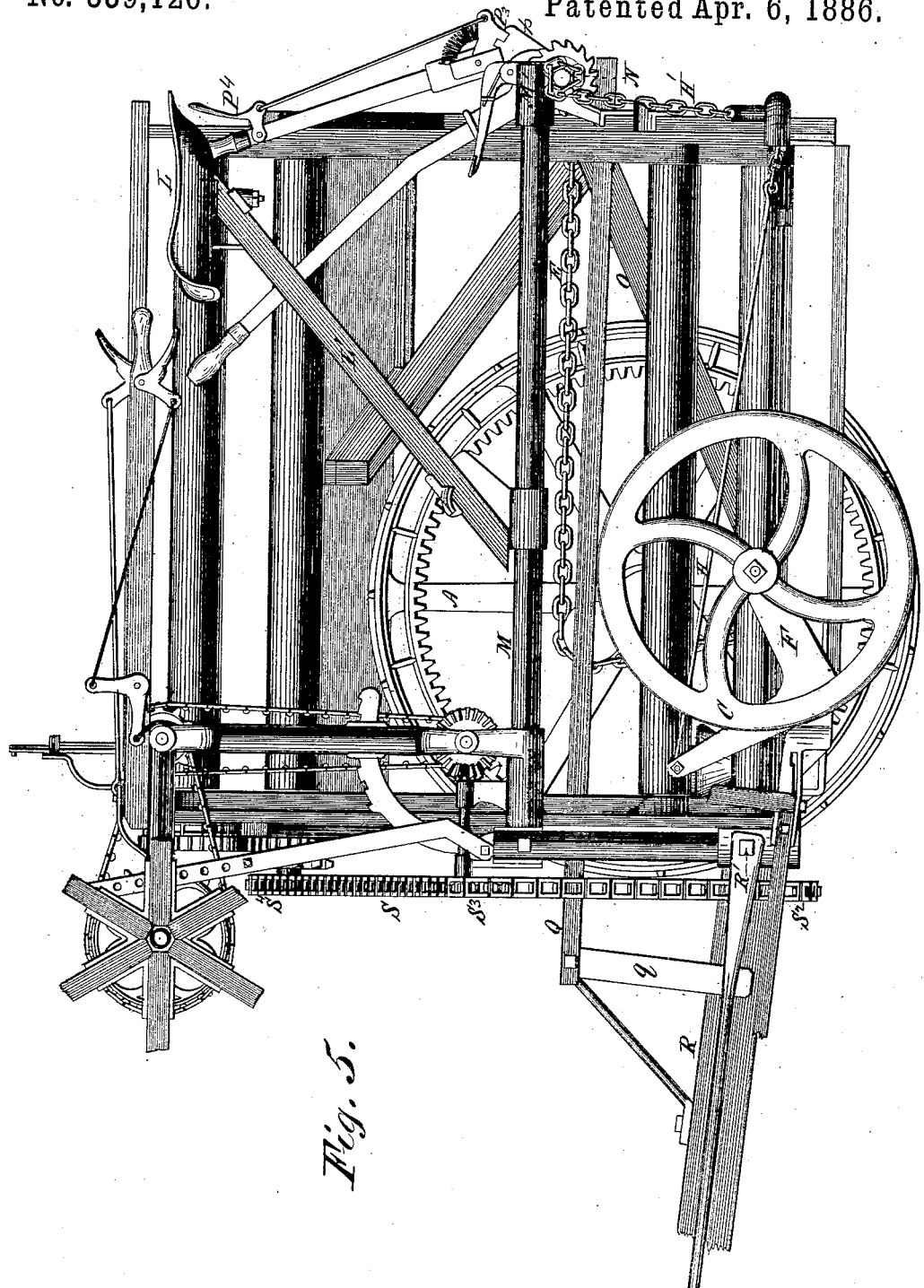
Figure 6:
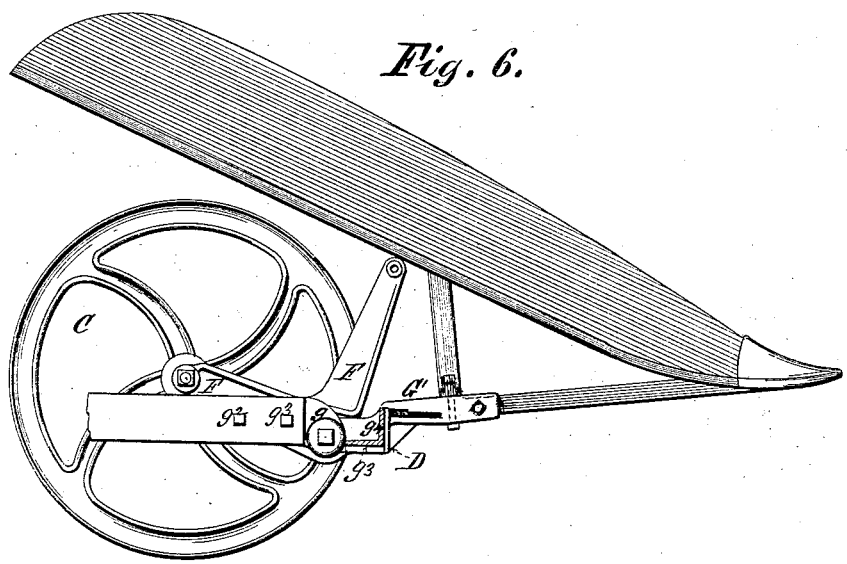
Figure 7:
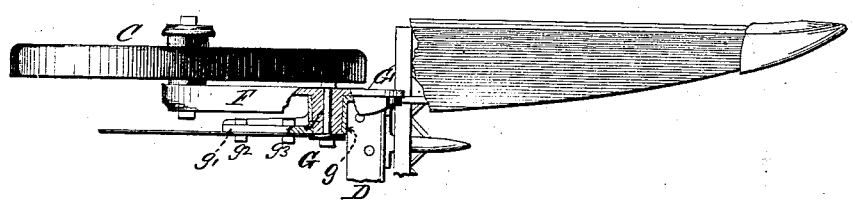
Figure 8:
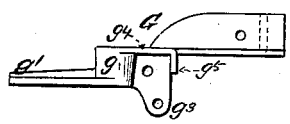

The accompanying drawings, illustrating my improvements applied to a harvester and binder of the type described, are as follows:

Figure 1 is a top view, having portions of the machine broken away in order to contract the area required for the drawings. Fig. 2 is a front elevation, partly in section, showing the principal portions of the machine. Fig. 3 is a rear elevation, partly in section, for the purpose, mainly, of showing the construction and arrangement of the raising and lowering and tilting mechanisms. Fig. 4 is an elevation of the stubble side of the frame, and further illustrating the raising and lowering and tilting mechanisms. Fig. 5 is an elevation of the grain-wheel end of the machine. Figs. 6 and 7 are respectively an inner side elevation and a top view, both partly in section, showing the mode of connection of the platform and grain-wheel. Fig. 8 is a top view of the inclined socket-piece and end guard to which the front corner of the grain end of the platform is secured, and which is pivotally connected with the crooked arm of the grain-wheel axle. Fig. 9 is a longitudinal section of the gear-frame U.

On referring to the drawings it will be seen that the machine is supported by means of a drive-wheel, A, and a grain-wheel, C, and that the axis of the drive-wheel is but a short distance in front of the axial line of the grain-wheel. The platform-frame is metallic, its front horizontal member being the finger-bar D, which inclines backward from the drive-wheel end of the cutters to a point nearly under the axial line of the drive-wheel, where it is provided with an eye, D', for connection with the windlass-chain E, by means of which the drive-wheel end of the platform is suspended upon a roller pivoted in a crank-arm cast upon the axle of the drive-wheel. The backwardly-inclined part of the finger-bar D is bolted to the rear edge of the bed-plate D². The grain-wheel end of the cutter-bar is pivoted in the angle of a crooked lever, F, one end of which—the end which projects rearwardly from its pivotal connection with the cutter-bar—is affixed to the axle of the grain-wheel, while the other end, which projects upward from its pivotal connection with the cutter-bar, is connected by the link H with the windlass-chain H'. This chain is led along suitable guide-pulleys, and is fastened to the grain-wheel end of the windlass-shaft N. By taking up or slacking the windlass-chain H' the crooked lever is swayed up and down upon its axis, which is the axle of the drive-wheel, thereby raising or lowering the grain-wheel end of the platform concurrently with the raising or lowering of the drive-wheel end, which is effected by the simultaneous taking up or slacking the windlass-chain E. The inclined side timbers, I I', of the elevator-frame are bolted at the bottom to the platform-frame, and the oppositely-inclined timbers J J' of the binder-deck are bolted to the upper portion of the inclined side timbers, respectively, of the elevator-frame. In the rear of the machine an inclined timber-brace, K, is bolted to the inclined deck-timber J at one end, and extends across the machine in a downwardly-inclined direction, and is bolted at its opposite end to the sill at the grain-wheel end of the platform. The brace K is also bolted to the inclined side timber, I, of the elevator-frame.

The driver's seat L is secured to the upper end of the usual inclined spring-bar, L', the lower end of which is secured to a metallic socket affixed to the horizontal tubular bar M. At its rear end the bar M is secured in the metallic socket M', provided with a downwardly-projecting lug, m, which is bolted to the inclined brace K, as shown in Fig. 3. The forward end of the bar M is inserted in a metallic socket, M², which is supported at the upper end of the tubular standard M³, the lower end of which is secured in a socket cast on the bed-plate D². The inclined timber-brace K' is bolted to the binder-deck timber J', and to the inclined side I' of the elevator, and has its lower end secured to the metallic socket M². The inclined timber-brace K' is also supported upon and fastened to the bed-plate D² by post K². The socket-piece M' is horizontally perforated to afford one of the bearings for the windlass-shaft N, as shown in Fig. 3. The socket-piece M' is also provided with an upwardly-extending flange, which is perforated to receive the pivot of the detent which acts to stop the rotation of the windlass ratchet-wheel N'. (Shown in Fig. 3.) This ratchet-wheel is operated, in the usual way, by means of the pawl-carrying lever N², the handle of which, as will be seen, is within convenient reaching distance from the driver's seat. The drive-wheel end bearing of the windlass-shaft N is afforded by the box n, provided with the upwardly-projecting lug n', which is bolted to the inclined timber K, and also provided with the parallel lugs n² and n³, forming a U-shaped socket, which embraces and is bolted to the rear end of an inclined brace, O, which extends forward in a downwardly-inclined direction, and at its forward end is bolted to the part of the cutter-bar immediately adjoining the eye D', to which the windlass-chain E is attached.

Instead of providing a metallic bearing for the drive-wheel end of the windlass-shaft in the box having the U-shaped socket for embracing the rear end of the inclined brace O, the brace O may be lengthened, as shown in dotted lines in Fig. 4, and be transversely perforated to receive the drive-wheel end of the windlass-shaft, and afford the bearing therefor, in which case suitable angle-plates must be provided for bolting the rear end of the brace O to the inclined timber-brace K.

On reference to Fig. 4 it will be seen that the inclined brace O acts as a stretcher between the part of the windlass-shaft to which one end of the windlass-chain E is attached and the part of the platform to which the other end of the said chain is attached. The brace O is of very great importance as a means of sustaining the windlass-shaft against the forward pull of the windlass-chain E, induced by the weight of the platform, which is suspended by means of the chain E.

The windlass-shaft N serves as the axis for the hollow rock-shaft P, which is a part of the mechanism by which the platform is tilted. The hollow shaft P is provided with a crank-arm, P', at its grain-wheel end, to which is attached the operating-lever P², the handle of which, as will be seen, is also within convenient reaching distance from the driver's seat. The lever P² has pivoted to it the usual spring-detent, P³, (shown in Fig. 5,) which is linked in the usual way to the bell-crank lever P⁴, by means of which the detent P³ can be lifted out of engagement with the teeth of the curved stationary rack p, when it is desired to sway the lever P² for the purpose of rocking the hollow shaft P. The stationary curved rack p is a quadrant-shaped casting provided with the lug p', which is bolted to the inclined timber K, and which is transversely perforated to admit the windlass-shaft N. The drive-wheel end of the hollow shaft P is provided with the crank-arm $P^5$, which is pivoted to the rear end of the bar or pitman Q, the forward end of which is pivoted to the upper end of a wooden standard, $q$, the lower end of which is bolted to the pole R. The standard $q$ is sustained in position by the inclined metallic brace $q'$, to the upper end of which the upper end of the bar or pitman Q is pivoted, while the lower end is secured to the pole by the bolt $q^2$. The rear end of the pole is connected with the platform-frame by the pivot R', which is the axis upon which the pole rocks. The braced upright $q$ is substantially a crank-arm, having its axis upon the pivot R'. The bar Q is simply a pitman connecting the upper end of the crank arm or standard $q$ with the crank-arm $P^5$ of the hollow shaft P.

On reference to Fig. 1 it will be seen that the pole and the stretcher O, extending from the drive-wheel end of the cutter-bar to the windlass-shaft, are in nearly the same vertical plane, and that the bar or pitman Q occupies a plane nearly adjoining the vertical plane occupied by the stretcher O. The function of the stretcher O, in respect of transmitting the forward strain upon the windlass-shaft to the end of the cutter-bar which is suspended upon the elevator-chain E, has already been explained. By the proximity of the pitman Q and its connections to the vertical plane occupied by the stretcher O it is made to act upon a part of the frame which has great rigidity, so that the platform in tilting moves bodily without being so warped or strained as to change the alignment of the shafting or interfere with the perfect operation of the platform and elevator-belt rollers.

The general organization of the machine is such that it is balanced upon two points of suspension. The drive-wheel A is provided with a hollow hub, A', and turns upon an axle, $a$, which is cast or otherwise formed in one piece with the crank-arm $a'$, the hollow crank-pin $a^2$ of which affords the bearing for the usual counter-shaft, $d$, having affixed to its drive-wheel end the usual pinion, $d'$, engaging the inside gear, $A^2$, of the drive-wheel. The grain-wheel end of the counter-shaft $d$ is provided with a bevel-pinion, $d^2$, which engages and drives a bevel-pinion, $d^3$, upon the upper end of the vertical shaft $d^4$, the lower end of which is provided with a crank, $d^5$, for giving motion to the cutter-bar, with which it is connected by the pitman $d^6$. The vertical shaft $d^4$ has its bearing in the gear-frame U, which is cast in one piece. At the bottom the gear-frame U is bolted to the bed-plate $D^2$, and at the top is connected by the tie-bolt U' with the upper end of the standard $D^3$, cast upon the bed-plate $D^2$. The standard $D^3$ and the similar standard, $D^4$, are transversely perforated to afford the bearings for the hollow crank-pin $a^2$. The bevel-pinion $d^2$ upon the grain-wheel end of the counter-shaft $d$ also engages and drives the bevel-wheel $s$, which is cast in one piece with the sprocket-wheel S. The bevel-wheel $s$ and sprocket-wheel S are centrally perforated and turn loosely upon a horizontal pin, $U^2$, which is inserted through a suitable aperture in the front side of the gear-frame U, and is seated in a corresponding recess formed through the side of the vertical tube which constitutes the bearing for the vertical shaft $d^4$. The sprocket-wheel S drives the main sprocket-chain S', which is the common instrumentality for imparting motion to the prime shafts of what I call the various "sub-mechanisms" of the machine. Thus the sprocket-chain S' drives the platform-rollers by engaging the sprocket-wheel $S^2$, and imparts motion to the reel by engaging the sprocket-wheel $S^3$, and drives the elevator-rollers by engaging the sprocket-wheel $S^4$, and, finally, drives the binding mechanism by engaging the sprocket-wheel $S^5$.

Upon a consideration of the frame of the machine as a whole it will be observed that the whole of the platform is between the drive-wheel and the grain-wheel, and that the binding apparatus, which is outside of the vertical plane of the drive-wheel, derives its support from the elevator-frame, which in its turn is supported upon the platform. To make such a construction practicable it is essential that the platform and frame of the machine on the grain-wheel side of the drive-wheel should be especially strong, and this part of the structure, which, as has been explained, is strengthened by the employment of the inclined stretcher O is further strengthened by the employment of the horizontal diagonal brace $D^5$, extending from the rear sill of the platform to the end of the finger-bar D, just below the place against which the forward end of the inclined stretcher O bears.

One of the features of my invention relates to the method of constructing the front corner of the grain-wheel end of the platform at the point where it is supported upon the crooked lever of the grain-wheel axle. The construction which I employ consists of a suitably-flanged socket and end guard, G, formed in a single casting, and bolted to the grain-end member of the platform-frame and to the finger-bar. This casting is provided with a conical socket, $g$, for the reception of the crank-pin $f$ of the crooked arm F of the grain-wheel axle, and is also provided with the rearwardly-projecting flange $g'$, which is secured to the grain end member of the platform-frame by the bolts $g^2$ $g^2$. Upon the forward side of the socket is cast the forwardly-projecting horizontal web $g^3$ and the vertical web $g^4$, which extends forward from the front side of the socket, and bends at a right angle and extends along a portion of the front edge of the web, $g^3$, where it forms the vertical web $g^5$. The grain-wheel end of the finger-bar D abuts against the inner side of the vertical web $g^4$, and against the inner side of the vertical web $g^5$ and is bolted down upon the horizontal web $g^3$. The end guard, G', is cast in one piece with the flanged socket G, extends forward therefrom, and serves to support the dividing-board, to the frame of which it is bolted, as shown in Fig. 6, to allow space for the vibrating cutter-bar. By this construction I am enabled to greatly strengthen the front corner of the grain end of the platform at the point where it receives its support without unduly increasing the weight of this part of the machine.

I claim as my invention—

1. The combined harvester and binder frame herein described, consisting, essentially, of a platform-frame having its grain end suitably supported upon the grain-wheel, and its opposite or stubble end supported upon the axle of a drive-wheel which is outside the platform-frame, an elevator-frame secured to the platform-frame, and extending upward and sidewise therefrom to a point over the top of the said drive-wheel, and a binder-deck frame suitably fastened to the elevator-frame, and inclining outwardly and downwardly from the upper part thereof.

2. In a harvester-platform frame, the drive-wheel end of which is supported upon the inner end of the axle of the drive-wheel, the horizontal brace D⁵, extending from the point of connection of the drive-wheel end of the platform with the windlass-chain backward in a diagonal direction to the rear sill of the platform, as shown and described.

3. In a harvester in which the windlass-shaft is arranged in the rear of the axial line of the drive-wheel, and in which the drive-wheel end of the platform is suspended from a windlass-chain which extends upward over a pulley suitably supported by the axle of the drive-wheel, and thence backward to the windlass-shaft, the stretcher or brace O, extending from the point of suspension of the platform, or from near that point, backward to the drive-wheel end of the windlass-shaft, or to the bearing which supports the end of the windlass-shaft adjoining the drive-wheel, substantially as and for the purpose described.

4. The stretcher or brace O, extending from the point of suspension of the platform, or from near that point, backward to the drive-wheel end of the windlass-shaft, or to the bearing supporting the drive-wheel end of the windlass-shaft, in combination, substantially as herein described, with mechanism for tilting the platform, occupying a vertical plane in close proximity to the vertical plane occupied by the stretcher O, and consisting, essentially, of a rock-shaft provided with a crank-arm having a pitman-connection with a pole pivoted to the front of the platform, and means for operating the said rock-shaft.

5. In a harvester, the combination of the platform-frame and the drive-wheel with a crank-arm affixed to or formed in one piece with the axle of the drive-wheel, and having its free end pivotally connected with the platform, a windlass arranged in the rear of the axial line of the drive-wheel, a windlass-chain extending forward from the windlass-shaft, and over a pulley pivotally supported upon or by the axle of the drive-wheel, and extending downward from the said pulley to the platform, and means for operating the windlass to take up or slack off the said chain, and thereby raise or lower the drive-wheel end of the platform.

6. A horizontal windlass-shaft arranged in the rear of the axial line of the drive-wheel, and means for operating the said shaft, in combination with a chain affixed to the drive-wheel end of the windlass-shaft, and extending forward therefrom over a pulley suitably supported upon or by the axle of the drive-wheel, and thence extending downward to the platform, and a chain affixed to the grain-wheel end of the windlass-shaft, led by suitable guide-pulleys downward, sidewise, and forward to the free end of a crooked lever affixed to the axle of the grain-wheel, and having its angle pivotally connected with the grain end of the platform.

7. The gear-frame U, cast in one piece, provided with flanges for the reception of the bolts by which it is secured to the bed-plate D², having formed in it a vertical aperture to serve as the bearing for the vertical crank-shaft d⁴, and having its front upright member and the front side of the tubular bearing of the vertical shaft transversely perforated to receive the pin U², which serves as the axis for the bevel-wheel s, and sprocket-wheel S, by means of which power is transmitted from the counter-shaft d to the main sprocket-chain S'.

8. The gear-frame U, cast in one piece and bolted at the bottom to the bed-plate D², and stayed at the top by the horizontal tie-bolt U', and otherwise constructed to afford the bearing for the vertical crank-shaft d⁴, and to receive the pin U², which serves as the axis for the bevel-wheel s, and sprocket-wheel S, substantially as set forth.

9. The flanged socket G and end guard, G', cast in one piece, in combination with the finger-bar and grain-end member of the platform, and the crooked arm F of the grain-wheel axle.

JOHN F. APPLEBY.

Witnesses:
JOHN R. BENNETT,
ROBT. C. HOWES.